United States Patent
Irving et al.

(10) Patent No.: US 12,081,571 B2
(45) Date of Patent: Sep. 3, 2024

(54) GRAPHICS PROCESSING UNIT OPTIMIZATION

(71) Applicant: Reveald Holdings, Inc., New York, NY (US)

(72) Inventors: Damion Irving, Brooklyn, NY (US); James Korge, Brooklyn, NY (US); Jeffrey L. Thomas, Columbus, OH (US); Donald Bathurst, Denver, CO (US)

(73) Assignee: Reveald Holdings, Inc., New York, NY (US)

( * ) Notice: Subject to any disclaimer, the term of this patent is extended or adjusted under 35 U.S.C. 154(b) by 129 days.

(21) Appl. No.: 17/877,133

(22) Filed: Jul. 29, 2022

(65) Prior Publication Data

US 2023/0032249 A1 Feb. 2, 2023

Related U.S. Application Data

(60) Provisional application No. 63/227,977, filed on Jul. 30, 2021.

(51) Int. Cl.
*H04L 29/06* (2006.01)
*G06N 20/00* (2019.01)
*H04L 9/40* (2022.01)

(52) U.S. Cl.
CPC ......... *H04L 63/1425* (2013.01); *G06N 20/00* (2019.01)

(58) Field of Classification Search
CPC ............ H04L 63/1425; H04L 63/1433; G06N 20/00; G06N 3/006; G06N 3/092; G06F 2221/034; G06F 21/577
See application file for complete search history.

(56) References Cited

U.S. PATENT DOCUMENTS

| | | | |
|---|---|---|---|
| 8,881,288 B1* | 11/2014 | Levy | G06F 21/577 709/225 |
| 10,033,754 B2 | 7/2018 | Pinney Wood et al. | |
| 10,084,822 B2* | 9/2018 | Papamartzivanos | H04L 63/1425 |

(Continued)

FOREIGN PATENT DOCUMENTS

| | | |
|---|---|---|
| WO | 2020/219157 | 10/2020 |
| WO | 2021/080577 | 4/2021 |

OTHER PUBLICATIONS

PCT International Search Report and Written Opinion in Application PCT/US2022/038829, mailed Nov. 28, 2022, 18 pages.

(Continued)

*Primary Examiner* — Harunur Rashid
(74) *Attorney, Agent, or Firm* — Merchant & Gould P.C.

(57) ABSTRACT

Methods, systems and computer program products are provided for optimizing resources privately. An initial information gain corresponding to an initial client embedding data set is computed and a machine learning model is trained based on the initial client embedding data set to generate at least one initial attack path in the initial graph data. A second information gain corresponding to a second client embedding data set is computed. A difference between the first information gain and the second information gain is computed. The machine learning model is trained if the difference between the first information gain and the second information gain meets a predetermined threshold to generate at least one new attack path in the second graph data.

21 Claims, 4 Drawing Sheets

(56) References Cited

U.S. PATENT DOCUMENTS

| | | | |
|---|---|---|---|
| 10,425,429 B2 | 9/2019 | Bassett | |
| 10,476,896 B2 | 11/2019 | DiValentin et al. | |
| 10,630,716 B1 | 4/2020 | Ghosh et al. | |
| 10,657,461 B2 | 5/2020 | McMahan et al. | |
| 10,848,515 B1* | 11/2020 | Pokhrel | H04L 63/1433 |
| 2015/0193695 A1 | 7/2015 | Cruz Mota et al. | |
| 2018/0159890 A1 | 6/2018 | Warnick | |
| 2019/0005195 A1 | 1/2019 | Peterson | |
| 2019/0061147 A1 | 2/2019 | Luciw | |
| 2019/0222593 A1* | 7/2019 | Craig | G06N 20/20 |
| 2019/0385051 A1 | 12/2019 | Wabgaonkar | |
| 2020/0145441 A1 | 5/2020 | Patterson | |
| 2020/0412767 A1* | 12/2020 | Crabtree | H04L 63/1441 |
| 2021/0021629 A1* | 1/2021 | Dani | H04L 63/1433 |
| 2021/0042471 A1 | 2/2021 | Ponomarev | |
| 2021/0234882 A1* | 7/2021 | Lee | G06T 15/005 |
| 2022/0014561 A1 | 1/2022 | Caceres | |
| 2022/0201014 A1* | 6/2022 | Saha | G06N 20/00 |
| 2022/0407879 A1 | 12/2022 | Dong | |
| 2023/0208882 A1 | 6/2023 | Crabtree | |
| 2023/0328094 A1 | 10/2023 | Brown | |

OTHER PUBLICATIONS

Zhang, Lei et al., "Discover the Hidden Attack Path in Multi-Domain Cyberspace Based on Reinforcement Learning", arXiv:2104.07195v1 [cs.CR], Apr. 15, 2021, 12 pages.

Alavizadeh, Hooman et al., "A Markov Game Model for AI-Based Cyber Security Attack Mitigation", arvix.org, Cornell University Library, Jul. 20, 2021, 11 pages.

He, Chaoyang et al., "FedGraphNN: A Federated Learning System and Benchmark for Graph Neural Networks", arxiv.org, Cornell University Library, Apr. 14, 2021, 19 pages.

McMahen, H. Brendan et al., "Communication-Efficient Learning of Deep Networks from Decentralized Data", Feb. 28, 2017, https://arxiv.org/pdf/1602.05629.pdf, retrieved on Jan. 7, 2019, 11 pages.

PCT International Search Report and Written Opinion in Application PCT/US2022/038845, mailed Oct. 25, 2022, 19 pages.

PCT International Search Report and Written Opinion in Application PCT/US2022/038863, mailed Oct. 27, 2022, 18 pages.

Yang, Qiang et al., "Federated Learning", IEEE, Dec. 31, 2020, https://ieeexplore.IEEE.org/abstract/document/8940936, retrieved on Dec. 31, 2020, 202 pages.

Kamden, Gael et al., "A Markov Game Theoritic Approach for Power Grid Security", 2017 IEEE 37th International Conference on Distributed Computing Systems Workshops, pp. 139-144.

* cited by examiner

Map First Structure to Second Structure to Generate First Client Embedding Data Set
202

Compute Initial Information Gain
204

Train machine learning model (e.g., reinforcement Learning Agent, neural network, etc.) to Generate at Least One Initial Attack Path
206

Map Third Structure to Fourth Structure to Generate Second Client Embedding Data Set
208

Compute Second Information Gain
210

Compute Difference Between First Information Gain and Second Information Gain
212

Diff {$IG_1$, $IG_2$} > T
214

No → Return 218

Yes → Retraining Machine Learning Model
216

GRAPHICS PROCESSING UNIT OPTIMIZATION

CROSS REFERENCE TO RELATED APPLICATION

This application claims priority to, and the benefit of, U.S. Provisional Patent Application Ser. No. 63/227,977, filed Jul. 30, 2021, which is hereby incorporated by reference in its entirety.

TECHNICAL FIELD

Example aspects described herein relate generally to network security, and more particularly to optimizing graphics processing unit (GPU) resources during machine learning training events while preserving siloed client data privacy.

BACKGROUND

A graphic processing unit (GPU) is a hardware component that is typically used to enhance application and system performance, particularly when used in cooperation with a central processing unit (CPU). Although GPUs were originally designed to accelerate the rendering of graphics, they deliver two important benefits that make them a versatile choice for high performance computational tasks in several industries. GPUs are programmable and can be used to accelerate applications beyond rendering graphics, such as artificial intelligence (AI). GPUs can also perform parallel processing with large blocks of data to deliver enormous computational capability in areas like machine learning.

While it is useful to leverage the advantages of GPU functionality to use them as "performance accelerators" it is also important to optimize their use.

A graph is a mathematical structure used to model pairwise relations between objects. Points are represented as nodes (also referred to sometimes as vertices) that are linked by edges (also referred to sometimes as links). A starting point within the graph is a point within a graph on which an agent commences seeking nodes (including the node that is the starting point) that can be compromised for the purpose of locating resources of any node that can be used to penetrate further within the network and access valuable resources.

A graph database uses highly inter-linked data structures built from nodes, relationships, and properties. In turn, these graph structures support sophisticated, semantically rich queries at scale.

Organizations store vast amounts of information. Sometimes the information is stored in distributed data silos or data sources. Data silos allow local control and governance in a way that is often valuable. Legal and regulatory considerations may require that some silos remain as silos. A silo is disconnected and prevents larger structures from being composed easily. Consequently, data silos mean that the datasets in each silo are unconnected. Similarly, the software stacks that support silos, such as with regard to machine learning inferencing, embedding generation, path generation (e.g., based on the inferencing), and the logic that that is used to send such data to a GPU server is siloed as well. That is, there is no crosstalk between client software stacks.

For any neural network, the training phase of the deep learning model is the most resource-intensive task. In a typical neural network, while training, a neural network receives inputs, which are then processed in hidden layers using weights that are adjusted during training and the model then outputs out a prediction. Weights are adjusted to find patterns in order to make better predictions. These operations are oftentimes essentially in the form of matrix multiplications, where the first array is the input to the neural network and the second array forms its weight. However, neural networks can have billions of parameters. While GPUs can be used for training artificial intelligence and deep learning models because of their ability to process multiple computations simultaneously, there is a need to utilize GPUs more efficiently. There is also a need to keep the data that is processed by GPUs as secure as possible.

SUMMARY

Systems, methods and computer program products for optimizing resources privately are provided. In one aspect of the disclosure, a method for optimizing resources privately may involve: mapping, by an algorithmic framework processor, a first structure represented by initial graph data to a second structure, the second structure having a lower dimension than the first structure and containing real numbers, thereby generating an initial client embedding data set; computing, by an information gain processor, an initial information gain corresponding to the initial client embedding data set; training, by a dedicated server, a machine learning model based on the initial client embedding data set to generate at least one initial attack path in the initial graph data; mapping, using the algorithmic framework processor, a third structure representing a second graph data to a fourth structure, the fourth structure having a lower dimension than the third structure and containing real numbers, thereby generating a second client embedding data set; computing, using the information gain processor, a second information gain corresponding to the second client embedding data set; computing, using a difference processor, a difference between the first information gain and the second information gain; and retraining, using the dedicated server, the machine learning model if the difference between the first information gain and the second information gain meets a predetermined threshold to generate at least one new attack path in the second graph data.

In some embodiments, the method may also involve siloing the initial graph data having a first structure representing information technology associated with an organization. In some embodiments, the method may also involve initiating, on the dedicated server, a training event associated with the initial graph data for the machine learning model. In some embodiments, the method may also involve detecting a change in the initial graph data. In some embodiments, the method may also involve receiving a change corresponding to a node property. In some embodiments, the method may also involve receiving a change in a relationship between two or more nodes.

In some embodiments, the information gain is a scalar representation showing an amount of information diversity in a client embedding data set. In some embodiments, the dedicated server a GPU (graphics processing unit) server. In some embodiments the information technology associated with the organization includes any one of (i) at least one on-premises resource, (ii) at least one third party service, (iii) at least one cloud computing service, (iv) a plurality of credentials associated with (i), (ii), (iii), or (v) any combination of (i), (ii), (iii) and Some embodiments may also involve: scoring, by a scoring processor, the at least one initial attack path, thereby generating at least one scored initial attack path; ranking, by a ranking processor, the at least one scored initial attack path, thereby generating a ranking of initial attack paths; providing the ranking of new attack paths to a user interface; scoring, by the scoring processor, the at least one new attack path, thereby generating at least one scored new attack path; ranking, by the ranking processor, the at least one scored new attack path, thereby generating a ranking of new attack paths; and providing the ranking of new attack paths to the user interface.

In some embodiments, the scoring is performed by measuring a utility of vulnerability associated with at least node in the initial attack path. The utility of vulnerability may be associated with the at least one node is based on a measure of exploitability. In some embodiments, measuring the utility of vulnerability includes obtaining an exploit associated with at least one node in the attack path.

In some embodiments, the information gain is computed by using an information gain formula.

In some embodiments, the method may also involve: receiving, from a user interface, an update including attribute data related to any one of (i) at least one node represented by the initial graph data, (ii) at least one edge represented by the initial graph data, or (iii) combination of (i) and (ii); and retraining, using the dedicated server, the machine learning model using the attribute data and the client embedding data set. In some embodiments, the retraining of the machine learning model using the attribute data and the client embedding data set occurs if the difference between the first information gain and the second information gain is less than a predetermined threshold.

In some embodiments, the method may also involve: calculating, by a scoring processor, a score corresponding to a security risk associated with the update or change to attribute data; computing, by the information gain processor, an initial information gain corresponding to the initial client embedding data set; training, using the dedicated server, the machine learning model based on the initial client embedding data set to generate at least one initial attack path in the initial graph data; mapping, using the algorithmic framework processor, a third structure representing a second graph data to a fourth structure, the fourth structure having a lower dimension than the third structure and containing real numbers, thereby generating a second client embedding data set; computing, using the information gain processor, a second information gain corresponding to the second client embedding data set; computing, by the difference processor, a difference between the first information gain and the second information gain; and retraining, using the dedicated server, the machine learning model if the difference between the first information gain and the second information gain meets a predetermined threshold to generate at least one new attack path in the second graph data.

Another aspect of the disclosure describes a system for optimizing resources privately involving: an algorithmic framework processor configured to map a first structure represented by initial graph data to a second structure, the second structure having a lower dimension than the first structure and containing real numbers, thereby generating an initial client embedding data set; an information gain processor configured to compute an initial information gain corresponding to the initial client embedding data set; a dedicated server configured to train a machine learning model based on the initial client embedding data set to generate at least one initial attack path in the initial graph data; the algorithmic framework processor further configured to map a third structure representing a second graph data to a fourth structure, the fourth structure having a lower dimension than the third structure and containing real numbers, thereby generating a second client embedding data set; the information gain processor further configured to compute a second information gain corresponding to the second client embedding data set; a difference processor configured to compute a difference between the first information gain and the second information gain; and the dedicated server further configured to retrain the machine learning model if the difference between the first information gain and the second information gain meets a predetermined threshold to generate at least one new attack path in the second graph data.

In some embodiments, the system may also involve at least one siloed database configured to silo the initial graph data having a first structure representing information technology associated with an organization. In some embodiments, the dedicated server is further configured to initiate a training event associated with the initial graph data for the machine learning model. In some embodiments, the user interface is further configured to receive a change in the initial graph data.

In some embodiments, the user interface is further configured to receive a change corresponding to a node property. In some embodiments, the user interface is further configured to receive a change in a relationship between two or more nodes. In some embodiments, the information gain is a scalar representation showing an amount of information diversity in a client embedding data set.

In some embodiments, the dedicated server a GPU (graphics processing unit) server.

In some embodiments, the information technology associated with the organization includes any one of (i) at least one on-premises resource, (ii) at least one third party service, (iii) at least one cloud computing service, (iv) a plurality of credentials associated with (i), (ii), (iii), or (v) any combination of (i), (ii), (iii) and (vi).

In some embodiments, the system may further involve a scoring processor configured to score the at least one initial attack path, thereby generating at least one scored initial attack path; a ranking processor configured to: rank the at least one scored initial attack path, thereby generating a ranking of initial attack paths, and provide the ranking of new attack paths to a user interface; the scoring processor further configured to score the at least one new attack path, thereby generating at least one scored new attack path; and the ranking processor further configured to: rank the at least one scored new attack path, thereby generating a ranking of new attack paths, and provide the ranking of new attack paths to the user interface. In some embodiments, the scoring processor is configured to perform scoring is by measuring a utility of vulnerability associated with at least node in the initial attack path. In some embodiments, the utility of vulnerability associated with the at least one node is based on a measure of exploitability. In some embodiments, measuring the utility of vulnerability includes: obtaining an exploit associated with at least one node in the attack path. In some embodiments, the information gain is computed by using an information gain formula.

In yet other embodiments, the system involves a user interface configured to receive an update including attribute data related to any one of (i) at least one node represented by the initial graph data, (ii) at least one edge represented by the initial graph data, or (iii) combination of (i) and (ii); and the dedicated server is further configured to retrain the machine learning model using the attribute data and the client embedding data set. In some embodiments, the retraining of the machine learning model using the attribute data and the client embedding data set occurs if the difference between the first information gain and the second information gain is less than a predetermined threshold.

In some embodiments, the system may involve a scoring processor configured to calculate a score corresponding to a security risk associated with the update or change to attribute data; the information gain processor further configured to compute an initial information gain corresponding to the initial client embedding data set; the dedicated server further configured to train the machine learning model based on the initial client embedding data set to generate at least one initial attack path in the initial graph data; the algorithmic framework processor further configured to map a third structure representing a second graph data to a fourth structure, the fourth structure having a lower dimension than the third structure and containing real numbers, thereby generating a second client embedding data set; the information gain processor further configured to compute a second information gain corresponding to the second client embedding data set; the difference processor further configured to compute a difference between the first information gain and the second information gain; and the dedicated server further configured to retrain the machine learning model if the difference between the first information gain and the second information gain meets a predetermined threshold to generate at least one new attack path in the second graph data.

Another aspect of the embodiments disclosed herein provides a non-transitory computer-readable medium having stored thereon one or more sequences of instructions for causing one or more processors to perform: mapping a first structure represented by initial graph data to a second structure, the second structure having a lower dimension than the first structure and containing real numbers, thereby generating an initial client embedding data set; computing an initial information gain corresponding to the initial client embedding data set; training a machine learning model based on the initial client embedding data set to generate at least one initial attack path in the initial graph data; mapping a third structure representing a second graph data to a fourth structure, the fourth structure having a lower dimension than the third structure and containing real numbers, thereby generating a second client embedding data set; computing a second information gain corresponding to the second client embedding data set; computing a difference between the first information gain and the second information gain; and retraining the machine learning model if the difference between the first information gain and the second information gain meets a predetermined threshold to generate at least one new attack path in the second graph data.

In some embodiments, the non-transitory computer-readable medium further has stored thereon a sequence of instructions for causing the one or more processors to perform: siloing the initial graph data having a first structure representing information technology associated with an organization.

In some embodiments, the non-transitory computer-readable medium further has stored thereon a sequence of instructions for causing the one or more processors to perform: initiating a training event associated with the initial graph data for the machine learning model.

In some embodiments, the non-transitory computer-readable medium further has stored thereon a sequence of instructions for causing the one or more processors to perform: detecting a change in the initial graph data.

In some embodiments, the non-transitory computer-readable medium further has stored thereon a sequence of instructions for causing the one or more processors to perform: receiving a change corresponding to a node property.

In some embodiments, the non-transitory computer-readable medium further has stored thereon a sequence of instructions for causing the one or more processors to perform: receiving a change in a relationship between two or more nodes.

In some embodiments, the information gain is a scalar representation showing an amount of information diversity in a client embedding data set.

In some embodiments, the information technology associated with the organization includes any one of (i) at least one on-premises resource, (ii) at least one third party service, (iii) at least one cloud computing service, (iv) a plurality of credentials associated with (i), (ii), (iii), or (v) any combination of (i), (ii), (iii) and (vi).

In some embodiments, the non-transitory computer-readable medium further has stored thereon a sequence of instructions for causing the one or more processors to perform: scoring the at least one initial attack path, thereby generating at least one scored initial attack path; ranking the at least one scored initial attack path, thereby generating a ranking of initial attack paths; providing the ranking of new attack paths to a user interface; scoring the at least one new attack path, thereby generating at least one scored new attack path; ranking the at least one scored new attack path, thereby generating a ranking of new attack paths; and provide the ranking of new attack paths to the user interface.

In some embodiments, the scoring is performed by measuring a utility of vulnerability associated with at least node in the initial attack path. In some embodiments, the utility of vulnerability associated with the at least one node is based on a measure of exploitability. In some embodiments, measuring the utility of vulnerability includes obtaining an exploit associated with at least one node in the attack path. In some embodiments, the information gain is computed by using an information gain formula.

In some embodiments, the non-transitory computer-readable medium further has stored thereon a sequence of instructions for causing the one or more processors to perform: receiving an update including attribute data related to any one of (i) at least one node represented by the initial graph data, (ii) at least one edge represented by the initial graph data, or (iii) combination of (i) and (ii); and retraining the machine learning model using the attribute data and the client embedding data set.

In some embodiments, the retraining of the machine learning model involves using the attribute data and the client embedding data set occurs if the difference between the first information gain and the second information gain is less than a predetermined threshold.

In some embodiments, the non-transitory computer-readable medium further has stored thereon a sequence of instructions for causing the one or more processors to perform: calculating a score corresponding to a security risk associated with the update or change to attribute data; computing an initial information gain corresponding to the initial client embedding data set; training the machine learning model based on the initial client embedding data set to generate at least one initial attack path in the initial graph data; mapping a third structure representing a second graph data to a fourth structure, the fourth structure having a lower dimension than the third structure and containing real numbers, thereby generating a second client embedding data set; computing a second information gain corresponding to the second client embedding data set; computing a difference between the first information gain and the second information gain; and retraining the machine learning model if the difference between the first information gain and the second information gain meets a predetermined threshold to generate at least one new attack path in the second graph data.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for graphics processing unit optimization, which are now described herein in terms of an example machine learning network for producing attack paths in a network graph. This description is not intended to limit the application of the example embodiments presented herein. In fact, after reading the following description, it will be apparent to one skilled in the relevant art(s) how to implement the following example embodiments in alternative embodiments involving machine learning models that make predictions or inferences based on network graph data (e.g., link prediction applications to identify where the nodes are connected to each other or referring to the same object).

Information gain as used herein is the amount of information gained about an attribute (e.g., a random variable) or signal. Information gain can be used in the construction of decision trees from a training dataset, by evaluating the information gain for each variable, and selecting the variable that maximizes the information gain, which in turn minimizes the entropy and best splits the dataset into groups for effective classification.

Reinforcement learning as used herein is the training of machine learning models to make a sequence of decisions. The agent learns to achieve a goal in an uncertain, potentially complex environment. In reinforcement learning, an artificial intelligence faces a game-like situation. The computer employs trial and error to come up with a solution to the problem. To get the machine to do what the programmer wants, the artificial intelligence gets either rewards or penalties for the actions it performs. Its goal is to maximize the total reward.

Given a machine learning model (e.g., a reinforcement learning (RL) agent, neural network, and the like) guided by a deep learning architecture, a federated learning framework is used to optimize GPU resources, during training events, while preserving siloed client data privacy.

Siloed client graph data is converted to an embedding representation. This process converts the highly unstructured graph data representation into a lower dimensional vector representation of real numbers. This process transforms the node, edges, and features into this vector space representation while encoding the graph structure and information that is machine readable.

The embedding representation is used to calculate the information-theoretic parameter called the "information gain". This metric is a scalar representation that shows the amount of information diversity in the client embedding data set. The metric is calculated initially for a client dataset. In turn, a training event for the machine learning model (e.g., a reinforcement learning (RL) agent, neural network, etc.) is initiated on a dedicated GPU server. When the client interacts with the graph, the embedding process and information gain process are repeated. If the change in information gain, exceeds a certain threshold, another GPU training event is initiated on a dedicated cluster. the embedding, information gain, GPU optimized training are completed in siloed software stacks for each client. This results in an incremental learning process for the machine learning model (e.g., an RL agent, neural network, and the like).

The newly learned agent model weights are sent to a central server, where a deep learning (DL) model weights are averaged out, using the information gain as a weighting factor. Proper scheduling allows for near continuous learning, adding to the agent as training events arise and are completed. Since model weights are sent in transit (and appropriately encrypted) no client graph data is sent or compromised, only learned information for the agent is sent in transfer. This process is effectively irreversible since it consists of two processes:

embedding generation (e.g., using Node2Vec), where there is a random element applied, making it a one-way process.

These embedding are trained on, resulting in learned model weights/DL parameters, these parameters cannot be reversed without having access to the embeddings and the exact structure of the DL architecture.

Embeddings do not persist outside of each client silo. In addition, they are replaced upon each client interaction with the data. In addition to the model weights, which are sufficiently mangled, the information gain parameter is sent in transit (also appropriately encrypted). This scalar representation of information diversity cannot be reversed to gain access to client graph data.

Each component of information flow, model weights and information gain, are irreversible. During the above process flow, the siloed client data remain separate, thereby preserving client data privacy. Equally important is the fact that GPU resources are optimized. Finally, the RL based agent can learn from client data sources in an incremental fashion based on the information gained, from client interaction.

Figure 1:
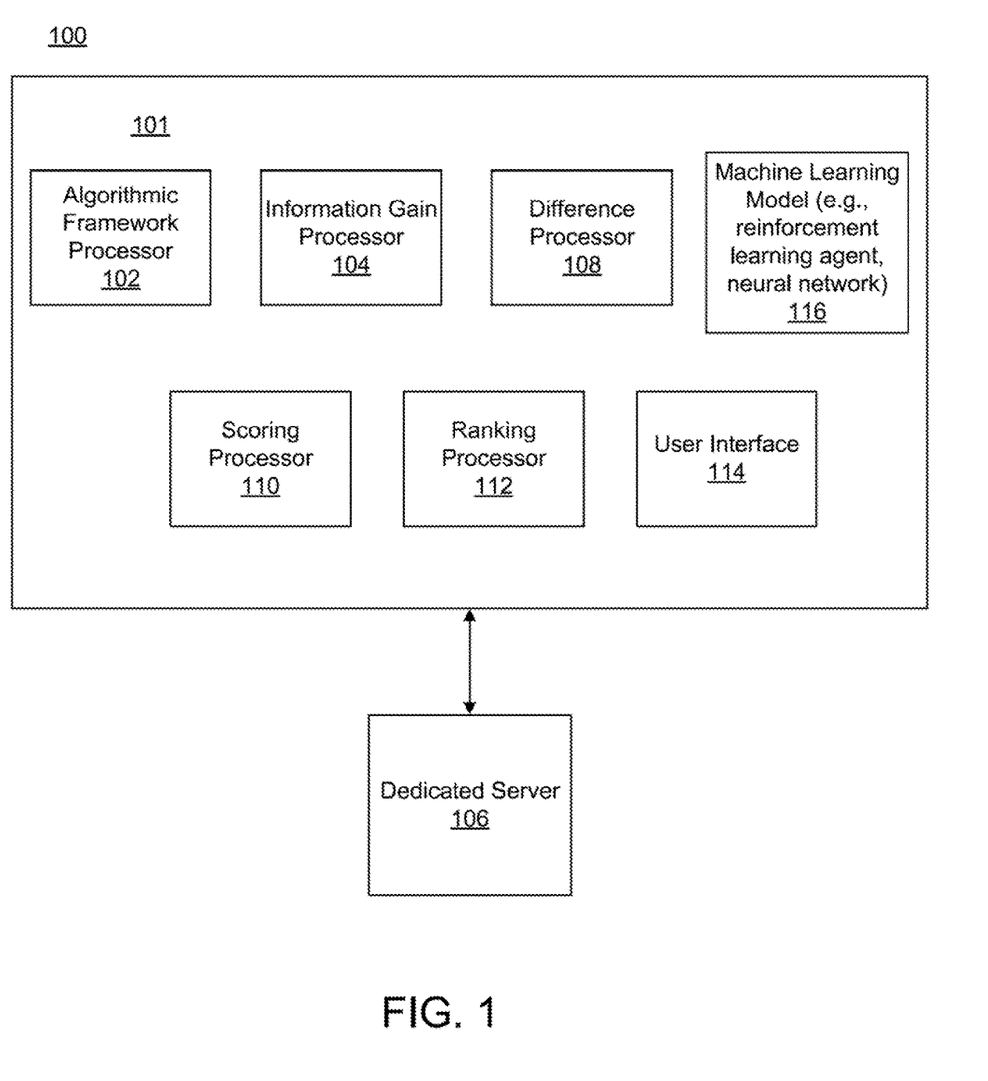
FIG. 1 illustrates an example system for optimizing resources privately.

FIG. 1 illustrates an example system 100 for optimizing resources privately. System 100 includes a dedicated server 106 and an optimization server 101. Optimization server 101 includes an algorithmic framework processor 102, an information gain processor 104, a difference processor 108, a scoring processor 110, a ranking processor 112, a user interface 114, and a reinforcement learning agent 116.

Dedicated server 106 can be a GPU (graphics processing unit) server. The dedicated server 106. Generally, dedicated server 106 is used to offload some of the functionality of optimization server 101.

The algorithmic framework processor 102 maps a first structure represented by initial graph data to a second structure, the second structure having a lower dimension than the first structure and containing real numbers to generate an initial client embedding data set. The information gain processor 104 computes an initial information gain corresponding to the initial client embedding data set. The dedicated server 106 trains a machine learning model (e.g., a reinforcement learning (RL) agent, neural network, and the like) based on the initial client embedding data set to generate at least one initial attack path in the initial graph data. In turn, the algorithmic framework processor maps a third structure representing a second graph data to a fourth structure, the fourth structure having a lower dimension than the third structure and containing real numbers to generate a second client embedding data set. The information gain processor 104 computes a second information gain corresponding to the second client embedding data set. The difference processor, in turn, computes a difference between the first information gain and the second information gain the dedicated server 106 trains the machine learning model if the difference between the first information gain and the second information gain meets a predetermined threshold to generate at least one new attack path in the second graph data.

In some embodiments, the initial graph data having a first structure representing information technology associated with an organization is siloed. In some embodiments, the dedicated server 106 is configured to initiate a training event associated with the initial graph data for a machine learning model (e.g., a reinforcement learning (RL) agent, neural network, and the like). In some embodiments the dedicated server 106 is configured to detect a change in the initial graph data. It may also be the case that the dedicated server 106 receives a change corresponding to a node property and/or a change in a relationship between two or more nodes.

The information gain, in some embodiments, is a scalar representation showing an amount of information diversity in a client embedding data set.

The information technology associated with the organization can include any one of (i) at least one on-premises resource, (ii) at least one third party service, (iii) at least one cloud computing service, (iv) a plurality of credentials associated with (i), (ii), (iii), or (v) any combination of (i), (ii), (iii) and (vi).

The scoring processor 110 scores the at least one initial attack path to generate at least one scored initial attack path. The ranking processor 112, in turn, ranks the at least one scored initial attack path to generate a ranking of initial attack paths. The ranking of new attack paths can then be provided to a user interface 114. The scoring processor 110 can also score the at least one new attack path to generate at least one scored new attack path. The ranking processor 112, in turn ranks the at least one scored new attack path to generate a ranking of new attack paths. The ranking of new attack paths can, in turn, be provide to the user interface 114. In some embodiments, the scoring is performed by measuring a utility of vulnerability associated with at least one node in the initial attack path. The utility of vulnerability can be associated with the at least one node is based on a measure of exploitability.

In some embodiments, measuring the utility of vulnerability includes obtaining an exploit associated with at least one node in the attack path. An exploit can be a piece of software, a chunk of data, or a sequence of commands that takes advantage of a bug or vulnerability to cause unintended or unanticipated behavior to occur on computer software, hardware, or something electronic.

In some embodiments, the information gain is computed by using an information gain formula (e.g., Shannon's Entropy).

In some embodiments, the user interface 114 is configured to receive an update including attribute data related to any one of (i) at least one node represented by the initial graph data, (ii) at least one edge represented by the initial graph data, or (iii) combination of (i) and (ii). An update as used herein is any new or changed data. In turn, the dedicated server retrains the machine learning model 116 using the attribute data and the client embedding data set. In some embodiments, the retraining of the machine learning model using the attribute data and the client embedding data set occurs if the difference between the first information gain and the second information gain is less than a predetermined threshold.

In some embodiments, the scoring processor 110 calculates a score corresponding to a security risk associated with the update or change to attribute data, the information gain processor 104 computes an initial information gain corresponding to the initial client embedding data set, the dedicated server 106 trains the machine learning model 116 based on the initial client embedding data set to generate at least one initial attack path in the initial graph data, the algorithmic framework processor maps a third structure representing a second graph data to a fourth structure, the fourth structure having a lower dimension than the third structure and containing real numbers to generate a second client embedding data set, the information gain processor 104 computes a second information gain corresponding to the second client embedding data set, the difference processor 108 computes a difference between the first information gain and the second information gain, and the dedicated server 106 retrains the machine learning model if the difference between the first information gain and the second information gain meets a predetermined threshold to generate at least one new attack path in the second graph data.

Figure 2:
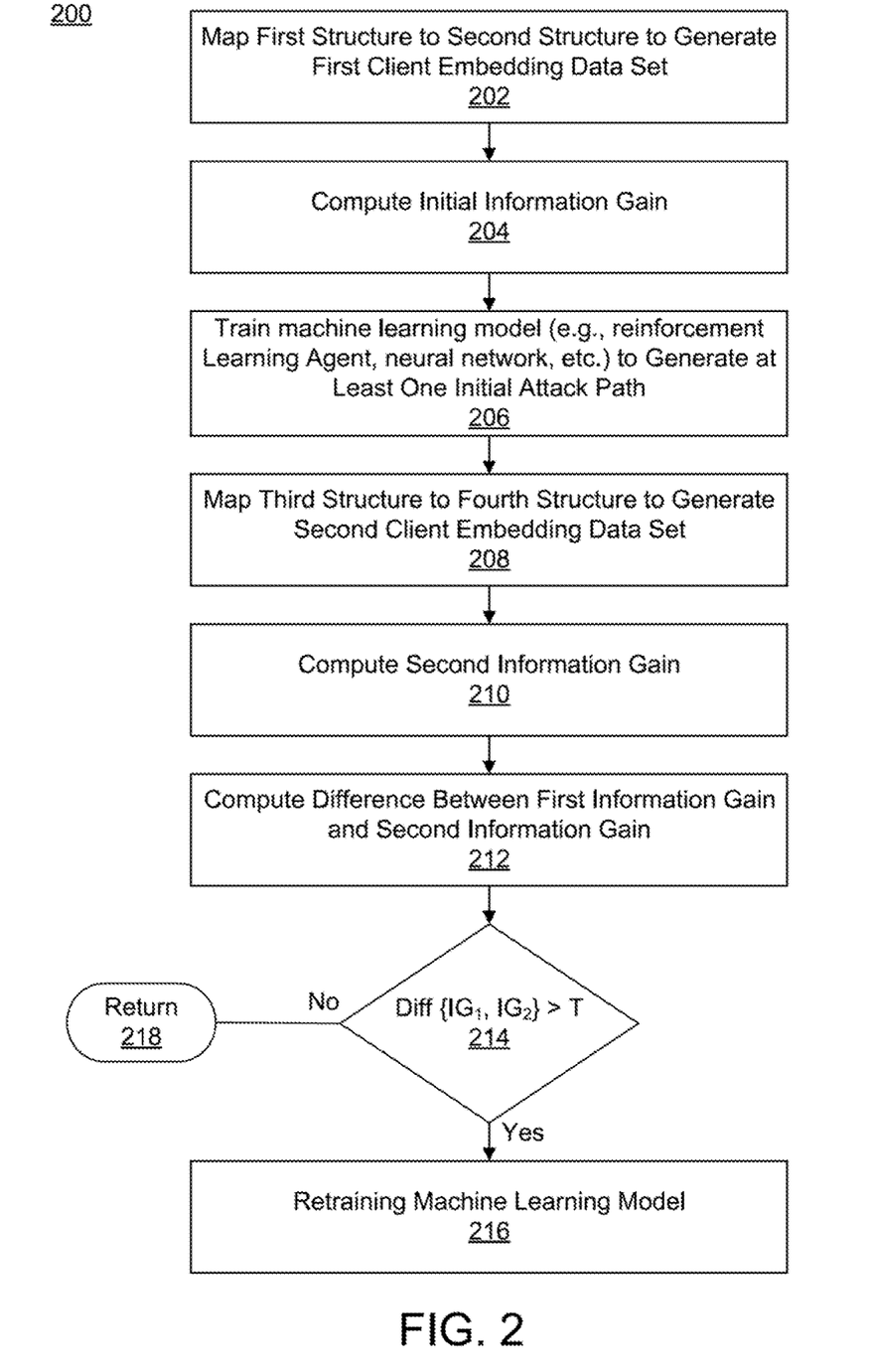
FIG. 2 depicts a flowchart of a method for optimizing resources privately according to an example embodiment.

FIG. 2 is a flowchart of a process 200 for optimizing resources privately according to an example embodiment. In step 202, process 200 performs mapping, a first structure represented by initial graph data to a second structure, the second structure having a lower dimension than the first structure and containing real numbers, thereby generating an initial client embedding data set (e.g., by algorithmic framework processor 102). In turn, an initial information gain corresponding to the initial client embedding data set is computed (e.g., by information gain processor 104), as shown in step 204. At step 206, a reinforcement learning agent is trained based on the initial client embedding data set to generate at least one initial attack path in the initial graph data training (e.g., by dedicated server 106). At step 208, a third structure representing a second graph data is mapped to a fourth structure, the fourth structure having a lower dimension than the third structure and containing real numbers, thereby generating a second client embedding data set (e.g., using the algorithmic framework processor 102). A second information gain corresponding to the second client embedding data set is also computed (e.g., using information gain processor 104), as shown at step 210. At step 212, a difference between the first information gain and the second information gain is computed (e.g., using a difference processor 108). In turn, at step 214, a determination is made as to whether the difference between the first information gain and the second information gain meets a predetermined threshold to generate at least one new attack path in the second graph data (e.g., using the dedicated server 106). If a determination is made at step 214 that the deference between the first information gain and the second information gain meets the predetermined threshold to generate at least one new attack path in the second graph data, the machine learning model is retrained, as shown in step 216. If a determination is made at step 214 that the difference between the first information gain and the second information gain does not meet the predetermined threshold to generate at least one new attack path in the second graph data, the process returns and no retraining takes place, as shown in step 218.

In some embodiments, the process silos the initial graph data having a first structure representing information technology associated with an organization.

In some embodiments, the process performs initiating, on the dedicated server, a training event associated with the initial graph data for a reinforcement learning agent.

In some embodiments, the process provides initiating, detecting a change in the initial graph data.

In some embodiments, the process performs receiving a change corresponding to a node property.

In some embodiments, the process performs receiving a change in a relationship between two or more nodes.

In some embodiments, the information gain is a scalar representation showing an amount of information diversity in a client embedding data set.

In some embodiments, the dedicated server a GPU (graphics processing unit) server.

In some embodiments, the information technology associated with the organization includes any one of (i) at least one on-premises resource, (ii) at least one third party service, (iii) at least one cloud computing service, (iv) a plurality of credentials associated with (i), (ii), (iii), or (v) any combination of (i), (ii), (iii) and (vi).

In some embodiments, the process performs scoring (e.g., by scoring processor 110), the at least one initial attack path, thereby generating at least one scored initial attack path; ranking (e.g., by ranking processor 112), the at least one scored initial attack path, thereby generating a ranking of initial attack paths; providing the ranking of new attack paths to a user interface 114; scoring (e.g., by the scoring processor 110), the at least one new attack path, thereby generating at least one scored new attack path; ranking (e.g., by the ranking processor 112) the at least one scored new attack path, thereby generating a ranking of new attack paths; and providing the ranking of new attack paths to the user interface 114.

In some embodiments, the scoring is performed by: measuring a utility of vulnerability associated with at least one node in the initial attack path.

In some embodiments, the utility of vulnerability associated with the at least one node is based on a measure of exploitability.

In some embodiments, measuring the utility of vulnerability includes: obtaining an exploit associated with at least one node in the attack path.

In some embodiments, the information gain is computed by using an information gain formula.

In some embodiments, the process further includes receiving (e.g., from a user interface), an update including attribute data related to any one of (i) at least one node represented by the initial graph data, (ii) at least one edge represented by the initial graph data, or (iii) combination of (i) and (ii); and retraining (e.g., using the dedicated server 106), the machine learning model 116 using the attribute data and the client embedding data set.

In some embodiments, the retraining of the machine learning model using the attribute data and the client embedding data set occurs if the difference between the first information gain and the second information gain is less than a predetermined threshold.

In some embodiments, the process further performs calculating (e.g., by scoring processor 110) a score corresponding to a security risk associated with the update or change to attribute data; computing (e.g., by the information gain processor 104) an initial information gain corresponding to the initial client embedding data set; training (e.g., using the dedicated server 106) the machine learning model based on the initial client embedding data set to generate at least one initial attack path in the initial graph data; mapping (e.g., using the algorithmic framework processor 102) a third structure representing a second graph data to a fourth structure, the fourth structure having a lower dimension than the third structure and containing real numbers, thereby generating a second client embedding data set; computing (e.g., using the information gain processor 104) a second information gain corresponding to the second client embedding data set; computing (e.g., by the difference processor 108) a difference between the first information gain and the second information gain; and retraining (e.g., using the dedicated server 106) the machine learning model if the difference between the first information gain and the second information gain meets a predetermined threshold to generate at least one new attack path in the second graph data.

Figure 3:
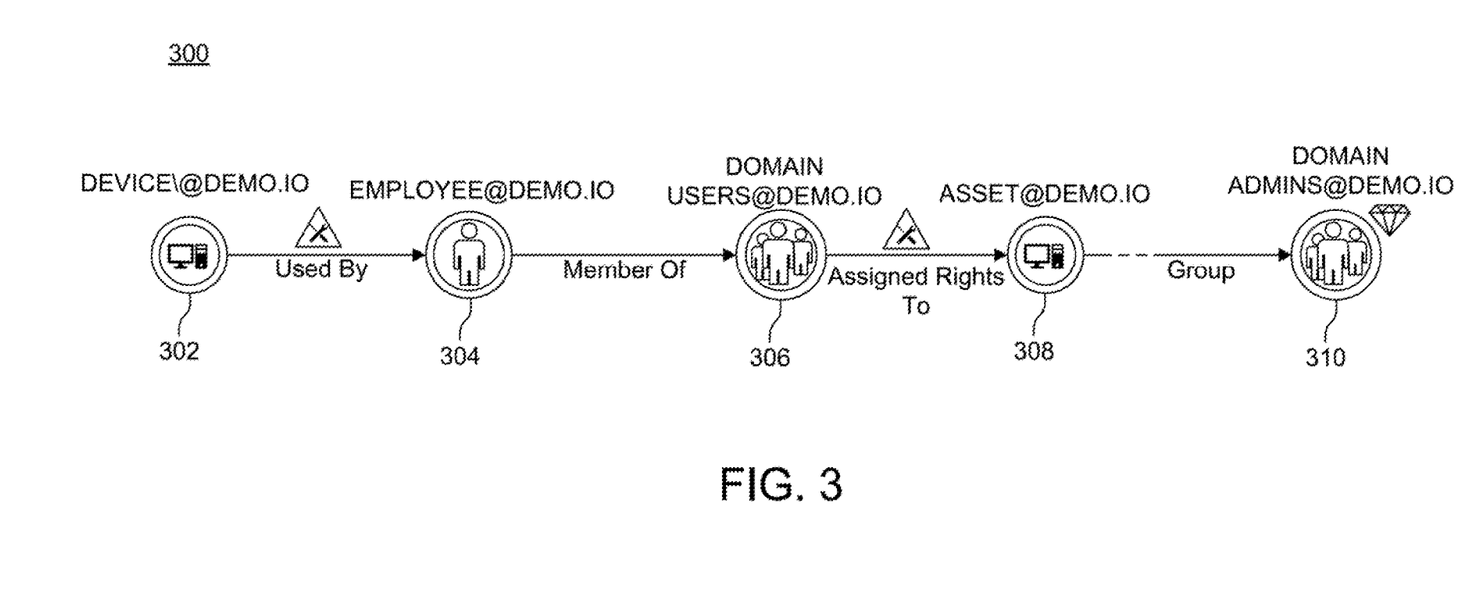
FIG. 3 shows an illustrative output of an interface representing an example attack path that leads from a node with vulnerabilities to a high value asset.

FIG. 3 depicts an illustrative output of an interface representing an example attack path that leads from a node 302 with vulnerabilities (e.g., an individual device) to a high value asset, node 310, (e.g., a domain administrator). In this example, the attack path leads from the node with vulnerabilities (e.g., node 302) that is a device used by an employee, node 304, which is a member of a domain, node 306. Domain (node 306) is assigned rights to another asset within the network, node 308, (e.g., a database) which in turn is connected to a high value asset, node 310, which in this example is an administrative domain asset, which if attacked or breached can lead to significant breach of an enterprise (e.g., by allowing an attacker to control various resources within the enterprise). It should be understood that other types of assets such as additional hardware devices, access by individuals, networks, groups, active directory permission, cloud resources, or other type of node, may be within the attack path. For example, an asset (e.g., a group) may be nested within another group, which is assigned, for example admin rights to a device. Any node (e.g., representing an asset) within the attack path can be a source for a foothold by an attacker.

As explained above, this description is not intended to limit the application of the example embodiments presented herein. Aspects of the embodiments can, for example, involve machine learning models that make predictions or inferences based on network graph data. Link prediction involves graph data having a set of nodes and edges. In certain circumstances there exists a problem in that a set of all edges E may not be known completely. Rather, only a partial set of the edges, e, is known. Link prediction aims to deduce which nodes are connected by edges in the set E not found in the set e.

Link prediction can be performed based on common neighbors, node-similarity, deep learning models, etc. In an example use case, a new set of nodes describing users is introduced into a network graph. After regenerating the embeddings of that graph, a trained machine learning model (e.g., a trained neural network) can be used to predict what edges exist (if any) between the new nodes and the other nodes in the graph (e.g., an edge identifying a user as a member of an administrative group). Other, unrelated, applications include predicting friendship in a social network, collaboration among scientific authors, and interactions between drugs.

Figure 4:
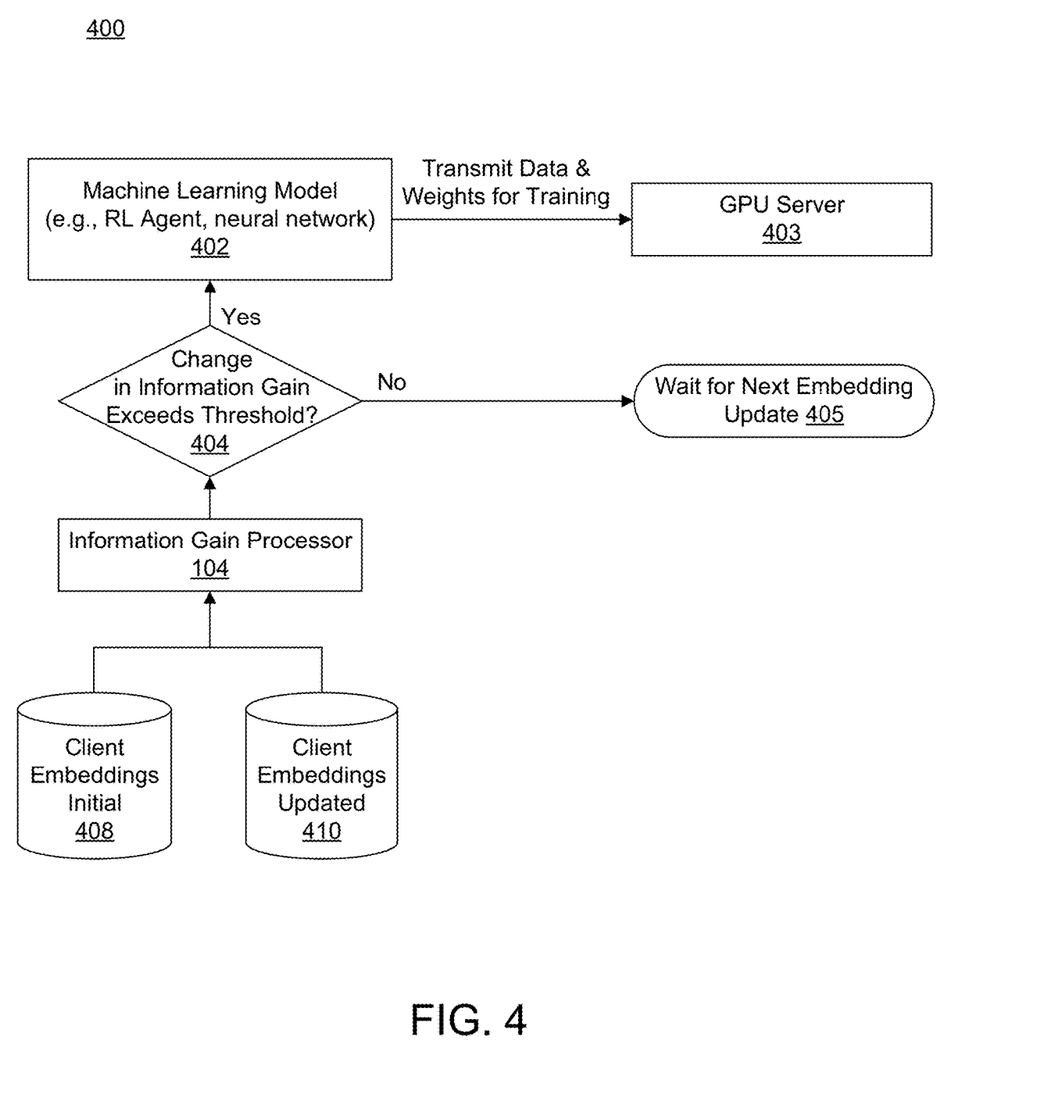
FIG. 4 is a system flow diagram illustrating an example resource optimization system, according to example embodiment.

FIG. 4 is a system flow diagram 400 illustrating an example resource optimization system, according to example embodiment. As shown in FIG. 4, an information gain processor 104 operates to receive embeddings data from two siloed databases. In turn, the information gain processor 104 calculates an information gain based on the embeddings data for each of the two siloed databases. In an example implementation a first siloed database is an initial client embedding database 408 and a second siloed database is an updated client embeddings database 410.

A determination operation 404 performs determining if a change in the information gain exceeds a threshold. A determination that a change in the information gain exceeds a threshold causes the initial client embeddings data, the updated client embeddings data, and the weights of a machine learning model 402 (e.g., a reinforcement learning agent, neural network, and the like) to be fed to a graphical processing unit (GPU) server 403 which trains the model using the data. A determination, by the determination operation 404, that a change in the information gain does not exceed a threshold causes the process to wait for the next embedding update, as depicted by embedding update receiving operation 405.

In another embodiment, there may be multiple such instances of client embedding databases and machine learning models. The use of information gain as a determinant for initiating a training event reduces the number of models and databases awaiting availability of the GPU server 403. It further prevents the GPU server from consuming resources (e.g., electric power) to train models on insignificant database updates.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random-access memory, for temporary data and program instruction storage. From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine-readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above-described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for optimizing resources privately, comprising:
   mapping, by an algorithmic framework processor, a first structure represented by initial graph data to a second structure, the second structure having a lower dimension than the first structure and containing real numbers, thereby generating an initial client embedding data set;

computing, by an information gain processor, an initial information gain corresponding to the initial client embedding data set;

training, by a dedicated server, a machine learning model based on the initial client embedding data set to generate at least one initial attack path in the initial graph data;

mapping, using the algorithmic framework processor, a third structure representing a second graph data to a fourth structure, the fourth structure having a lower dimension than the third structure and containing real numbers, thereby generating a second client embedding data set;

computing, using the information gain processor, a second information gain corresponding to the second client embedding data set;

computing, using a difference processor, a difference between the first information gain and the second information gain; and retraining, using the dedicated server, the machine learning model if the difference between the first information gain and the second information gain meets a predetermined threshold to generate at least one new attack path in the second graph data scoring, by a scoring processor the at least one initial attack path, thereby generating at least one scored initial attack path;

ranking, by a ranking processor the at least one scored initial attack path, thereby generating a ranking of initial attack paths;

providing the ranking of new attack paths to a user interface;

scoring, by the scoring processor the at least one new attack path, thereby generating at least one scored new attack path;

ranking, by the ranking processor the at least one scored new attack path, thereby generating a ranking of new attack paths; and providing the ranking of new attack paths to the user interface.

2. The method according to claim 1, wherein the information technology associated with the organization includes any one of (i) at least one on-premises resource, (ii) at least one third party service, (iii) at least one cloud computing service, (iv) a plurality of credentials associated with (i), (ii), (iii), or (v) any combination of (i), (ii), (iii) and (vi).

3. The method according to claim 1, wherein the scoring is performed by:
measuring a utility of vulnerability associated with at least node in the initial attack path.

4. The method according to claim 1, wherein measuring the utility of vulnerability includes:
obtaining an exploit associated with at least one node in the attack path.

5. The method according to claim 1, further comprising:
receiving, from a user interface, an update including attribute data related to any one of (i) at least one node represented by the initial graph data, (ii) at least one edge represented by the initial graph data, or (iii) combination of (i) and (ii); and retraining, using the dedicated server, the machine learning model using the attribute data and the client embedding data set.

6. The method according to claim 5, wherein the retraining of the machine learning model using the attribute data and the client embedding data set occurs if the difference between the first information gain and the second information gain is less than a predetermined threshold.

7. The method according to claim 5, further comprising:
calculating, by a scoring processor, a score corresponding to a security risk associated with the update or change to attribute data;

computing, by the information gain processor, an initial information gain corresponding to the initial client embedding data set;

training, using the dedicated server, the machine learning model based on the initial client embedding data set to generate at least one initial attack path in the initial graph data;

mapping, using the algorithmic framework processor, a third structure representing a second graph data to a fourth structure, the fourth structure having a lower dimension than the third structure and containing real numbers, thereby generating a second client embedding data set;

computing, using the information gain processor, a second information gain corresponding to the second client embedding data set;

computing, by the difference processor, a difference between the first information gain and the second information gain; and retraining, using the dedicated server, the machine learning model if the difference between the first information gain and the second information gain meets a predetermined threshold to generate at least one new attack path in the second graph data.

8. A system for optimizing resources privately, comprising:
a memory;

an algorithmic framework processor configured to map a first structure represented by initial graph data to a second structure, the second structure having a lower dimension than the first structure and containing real numbers, thereby generating an initial client embedding data set;

an information gain processor configured to compute an initial information gain corresponding to the initial client embedding data set;

a dedicated server configured to train a machine learning model based on the initial client embedding data set to generate at least one initial attack path in the initial graph data;

the algorithmic framework processor further configured to map a third structure representing a second graph data to a fourth structure, the fourth structure having a lower dimension than the third structure and containing real numbers, thereby generating a second client embedding data set;

the information gain processor further configured to compute a second information gain corresponding to the second client embedding data set;

a difference processor configured to compute a difference between the first information gain and the second information gain; and the dedicated server further configured to retrain the machine learning model if the difference between the first information gain and the second information gain meets a predetermined threshold to generate at least one new attack path in the second graph data a scoring processor configured to score the at least one initial attack path, thereby generating at least one scored initial attack path;
a ranking processor configured to:
rank the at least one scored initial attack path, thereby generating a ranking of initial attack paths, and
provide the ranking of new attack paths to a user interface; the scoring processor further configured to score the at least one new attack path, thereby generating at least one scored new attack path; and
the ranking processor further configured to:
rank the at least one scored new attack path, thereby generating a ranking of new attack paths, and provide the ranking of new attack paths to the user interface.

9. The system according to claim 8, wherein the information technology associated with the organization includes any one of (i) at least one on-premises resource, (ii) at least one third party service, (iii) at least one cloud computing service, (iv) a plurality of credentials associated with (i), (ii), (iii), or (v) any combination of (i), (ii), (iii) and (vi).

10. The system according to claim 8, wherein the scoring processor is configured to perform scoring is by measuring a utility of vulnerability associated with at least node in the initial attack path.

11. The system according to claim 8, wherein measuring the utility of vulnerability includes:
obtaining an exploit associated with at least one node in the attack path.

12. The system according to claim 8, further comprising:
a user interface configured to receive an update including attribute data related to any one of (i) at least one node represented by the initial graph data, (ii) at least one edge represented by the initial graph data, or (iii) combination of (i) and (ii); and
the dedicated server is further configured to retrain the machine learning model using the attribute data and the client embedding data set.

13. The system according to claim 12, wherein the retraining of the machine learning model using the attribute data and the client embedding data set occurs if the difference between the first information gain and the second information gain is less than a predetermined threshold.

14. The system according to claim 12, further comprising:
a scoring processor configured to calculate a score corresponding to a security risk associated with the update or change to attribute data;
the information gain processor further configured to compute an initial information gain corresponding to the initial client embedding data set;
the dedicated server further configured to train the machine learning model based on the initial client embedding data set to generate at least one initial attack path in the initial graph data;
the algorithmic framework processor further configured to map a third structure representing a second graph data to a fourth structure, the fourth structure having a lower dimension than the third structure and containing real numbers, thereby generating a second client embedding data set;
the information gain processor further configured to compute a second information gain corresponding to the second client embedding data set;
the difference processor further configured to compute a difference between the first information gain and the second information gain; and the dedicated server further configured to retrain the machine learning model if the difference between the first information gain and the second information gain meets a predetermined threshold to generate at least one new attack path in the second graph data.

15. A non-transitory computer-readable medium having stored thereon one or more sequences of instructions for causing one or more processors to perform:
mapping a first structure represented by initial graph data to a second structure, the second structure having a lower dimension than the first structure and containing real numbers, thereby generating an initial client embedding data set;
computing an initial information gain corresponding to the initial client embedding data set;
training a machine learning model based on the initial client embedding data set to generate at least one initial attack path in the initial graph data;
mapping a third structure representing a second graph data to a fourth structure, the fourth structure having a lower dimension than the third structure and containing real numbers, thereby generating a second client embedding data set;
computing a second information gain corresponding to the second client embedding data set;
computing a difference between the first information gain and the second information gain; and
retraining the machine learning model if the difference between the first information gain and the second information gain meets a predetermined threshold to generate at least one new attack path in the second graph data
scoring the at least one initial attack path, thereby generating at least one scored initial attack path;
ranking the at least one scored initial attack path, thereby generating a ranking of initial attack paths;
providing the ranking of new attack paths to a user interface;
scoring the at least one new attack path, thereby generating at least one scored new attack path;
ranking the at least one scored new attack path, thereby generating a ranking of new attack paths; and
provide the ranking of new attack paths to the user interface.

16. The non-transitory computer-readable medium of claim 15, wherein the information technology associated with the organization includes any one of (i) at least one on-premises resource, (ii) at least one third party service, (iii) at least one cloud computing service, (iv) a plurality of credentials associated with (i), (ii), (iii), or (v) any combination of (i), (ii), (iii) and (vi).

17. The non-transitory computer-readable medium of claim 15, wherein the scoring is performed by:
measuring a utility of vulnerability associated with at least node in the initial attack path.

18. The non-transitory computer-readable medium of claim 15, wherein measuring the utility of vulnerability includes:
obtaining an exploit associated with at least one node in the attack path.

19. The non-transitory computer-readable medium of claim 15, further having stored thereon a sequence of instructions for causing the one or more processors to perform:
calculating a score corresponding to a security risk associated with the update or change to attribute data;

computing an initial information gain corresponding to the initial client embedding data set;

training the machine learning model based on the initial client embedding data set to generate at least one initial attack path in the initial graph data;

mapping a third structure representing a second graph data to a fourth structure, the fourth structure having a lower dimension than the third structure and containing real numbers, thereby generating a second client embedding data set;

computing a second information gain corresponding to the second client embedding data set;

computing a difference between the first information gain and the second information gain; and retraining the machine learning model if the difference between the first information gain and the second information gain meets a predetermined threshold to generate at least one new attack path in the second graph data.

20. The non-transitory computer-readable medium of claim 15, further having stored thereon a sequence of instructions for causing the one or more processors to perform:

receiving an update including attribute data related to any one of (i) at least one node represented by the initial graph data, (ii) at least one edge represented by the initial graph data, or (iii) combination of (i) and (ii); and retraining the machine learning model using the attribute data and the client embedding data set.

21. The non-transitory computer-readable medium of claim 15, wherein the retraining of the machine learning model using the attribute data and the client embedding data set occurs if the difference between the first information gain and the second information gain is less than a predetermined threshold.

\* \* \* \* \*